US008954194B2

(12) United States Patent
Allis et al.

(10) Patent No.: US 8,954,194 B2
(45) Date of Patent: Feb. 10, 2015

(54) REMOTE VEHICLE CONTROL SYSTEM AND METHOD

(75) Inventors: Daniel Allis, Lynn, MA (US); Robert Todd Pack, Nashua, NH (US)

(73) Assignee: iRobot Corporation, Bedford, MA (US)

( * ) Notice: Subject to any disclaimer, the term of this patent is extended or adjusted under 35 U.S.C. 154(b) by 18 days.

(21) Appl. No.: 13/106,792

(22) Filed: May 12, 2011

(65) Prior Publication Data

US 2011/0301786 A1    Dec. 8, 2011

Related U.S. Application Data

(60) Provisional application No. 61/334,167, filed on May 12, 2010.

(51) Int. Cl.
*G06F 19/00*     (2011.01)
*G05B 15/00*    (2006.01)
*G05B 19/00*    (2006.01)
*G05D 1/00*       (2006.01)

(52) U.S. Cl.
CPC ...... *G05D 1/0038* (2013.01); *G05D 2201/0209* (2013.01)
USPC ............................ 700/259; 700/245; 700/258

(58) Field of Classification Search
CPC . G05D 1/0011; G05D 1/0016; G05D 1/0038; G05D 1/0044; G05D 1/0094; G05D 1/0246; G05D 1/0251; G05D 1/0297; G05D 2201/0207; G05D 2201/0209
USPC .............. 701/2; 700/245, 249, 257, 258, 259, 700/264; 715/700–866
See application file for complete search history.

(56) References Cited

U.S. PATENT DOCUMENTS 6,535,793 B2 *   3/2003   Allard .......................... 700/259
7,031,158 B2 *   4/2006   Leon et al. .................... 361/700

(Continued)

FOREIGN PATENT DOCUMENTS

WO   WO 2009/019699 A2    2/2009
WO   WO 2009/089369 A1    7/2009

OTHER PUBLICATIONS

Yamauchi, Brian. "Autonomous urban reconnaissance using man-portable UGVs", In Proceedings of SPIE vol. 6230: Unmanned Ground Technology VIII, Orlando, FL, May 9, 2006.*
International Search Report for Application No. PCT/US2011/036352 dated Jun. 26, 2012.
Terrence W Fonfg et al: "Novel interfaces for remote driving: gesture, haptic and PDA", Proceeding of Spie, Spie, US, vol. 4195-33, Nov. 1, 2000, pp. 300-311, XP009118241, ISSN: 0277-786X p. 308-p. 309; figures 12-13.

(Continued)

*Primary Examiner* — Khoi Tran
*Assistant Examiner* — Robert Nguyen
(74) *Attorney, Agent, or Firm* — Honigman Miller Schwartz and Cohn LLP

(57) ABSTRACT

A system increases an operator's situational awareness while the operator controls a remote vehicle. The system comprises an operator control unit having a point-and-click interface configured to allow the operator to view an environment surrounding the remote vehicle and control the remote vehicle, and a payload attached to the remote vehicle and in communication with at least one of the remote vehicle and the operator control unit. The payload comprises an integrated sensor suite including GPS, an inertial measurement unit, a stereo vision camera, and a range sensor, and a computational module receiving data from the GPS, the inertial measurement unit, the stereo vision camera, and the range sensor and providing data to a CPU including at least one of an autonomous behavior and a semi-autonomous behavior that utilize data from the integrated sensor suite.

18 Claims, 11 Drawing Sheets

(56) References Cited

U.S. PATENT DOCUMENTS

| | | | |
|---|---|---|---|
| 7,317,987 B2 * | 1/2008 | Nahla | 701/301 |
| 8,155,787 B2 * | 4/2012 | Chalubert et al. | 700/245 |
| 8,239,087 B2 * | 8/2012 | Dybalski et al. | 701/29.1 |
| 2005/0216181 A1 * | 9/2005 | Estkowski et al. | 701/200 |
| 2008/0027590 A1 * | 1/2008 | Phillips et al. | 701/2 |
| 2008/0027591 A1 * | 1/2008 | Lenser et al. | 701/2 |
| 2009/0276105 A1 * | 11/2009 | Lacaze et al. | 701/2 |

OTHER PUBLICATIONS

International Search Report of International Publication No. WO 2012/021192 (International Application PCT/US2011/036352) dated Mar. 21, 2012.

Australian Office Action for Application No. 2011289866 dated Feb. 11, 2014.

* cited by examiner

REMOTE VEHICLE CONTROL SYSTEM AND METHOD

This patent application claims priority to U.S. Provisional Patent Application No. 61/334,167, filed May 12, 2011, titled Remote Vehicle Control System and Method, the disclosure of which is incorporated by reference herein in its entirety.

INTRODUCTION

The present teachings relate to a system and method for increasing remote vehicle operator effectiveness and situational awareness. The present teachings relate more specifically to a system comprising an operator control unit (OCU), a payload, and customized OCU applications that increase remote vehicle operator effectiveness and situational awareness.

BACKGROUND

A compelling argument for military robotics is the ability of remote vehicles to multiply the effective force or operational capability of an operator while simultaneously limiting the operator's exposure to safety risks during hazardous missions. The goals of force multiplication and increased operator capability have arguably not been fully realized due to the lack of autonomy in fielded robotic systems. Because low-level teleoperation is currently required to operate fielded remote vehicles, nearly 100% of an operator's focus may be required to effectively control a robotic system which may be a fraction as effective as the soldier. Teleoperation usually shifts the operator's focus away from his own position to the remote vehicle, which can be over 800 meters away to gain safety through increased stand-off distances. Thus, mission effectiveness may be sacrificed for standoff range.

SUMMARY

The present teachings provide a system that increases an operator's situational awareness while the operator controls a remote vehicle. The system comprises an operator control unit having a point-and-click interface configured to allow the operator to view an environment surrounding the remote vehicle and control the remote vehicle, and a payload attached to the remote vehicle and in communication with at least one of the remote vehicle and the operator control unit. The payload comprises an integrated sensor suite including global positioning system (or like system) (GPS), an inertial measurement unit (IMU), a stereo vision camera, and a range sensor (e.g., LIDAR), and a computational module receiving data from the GPS, the IMU, the stereo vision camera, and the range sensor and providing data to a CPU including at least one of an autonomous behavior and a semi-autonomous behavior that utilize data from the integrated sensor suite.

The system can also comprise at least one smart camera module, illuminators, and supporting electronics. An interface between the operator control unit and the remote vehicle can include an Ethernet link from the remote vehicle to the payload and a networked radio link from the payload to the operator control unit. The computational module can be configured to provide 3D local perceptual space data for display on the operator control unit, and the 3D local perceptual space data can be stored in a high-performance database that fuses localization sensor data and ranging sensor data using fast geometric indexing and Bayesian evidence accumulation and scan registration functionality. The 3D location perceptual space data can be shared between a remote vehicle operator the at least one autonomous or semi-autonomous behavior.

The system can additionally comprise a behavior engine configured to provide kinodynamic, real-time motion planning that accounts for the dynamics and kinematics of the remote vehicle. A Joint Architecture for Unmanned Systems (JAUS) gateway can be configured to interface with the behavior engine, and can be configured to interface with the 3D local perceptual space data.

The present teachings also provide A method for controlling a remote vehicle by interacting with a display including a representation of the remote vehicle, a map of an environment of the remote vehicle, and a video feed of the environment of the remote vehicle. The method comprises: selecting a part of the remote vehicle representation corresponding to the portion of the remote vehicle to be commanded; and selecting a command for the remote vehicle.

The part of the remote vehicle representation can comprise a chassis, and selecting a command for the remote vehicle can comprise selecting a stair climbing icon. The part of the remote vehicle representation can comprise a chassis, and selecting a command for the remote vehicle can comprise selecting a location in the video feed to which the remote vehicle will drive. The part of the remote vehicle representation can comprise a chassis, and selecting a command for the remote vehicle can comprise selecting a location in the map to which the remote vehicle will drive. The map can comprise a 3D local perceptual space display.

The part of the remote vehicle representation can comprises a manipulator arm, and selecting a command for the remote vehicle can comprise selecting a object in the video feed for the manipulator arm to manipulate. The part of the remote vehicle representation can comprise a manipulator arm, and selecting a command for the remote vehicle can comprise selecting a object in the map for the manipulator arm to manipulate. The map can comprise a 3D local perceptual space display.

The part of the remote vehicle representation can comprise a camera mounted on the remote vehicle, and selecting a command for the remote vehicle can comprise selecting a location in a video feed of the camera that the camera should zoom to. The part of the remote vehicle representation can comprise a camera mounted on the remote vehicle, and selecting a command for the remote vehicle can comprise selecting a location on the map that the camera should pan to. The map can comprise a 3D local perceptual space display.

The method can further comprise looking at the map from more than one perspective by dragging on a displayed widget that changes the map between at least a top view and a forward view.

Additional objects and advantages of the present teachings will be set forth in part in the description which follows, and in part will be obvious from the description, or may be learned by practice of the teachings. The objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate exemplary embodiments of the present teachings and, together with the description, serve to explain the principles of the present teachings.

DESCRIPTION OF THE EMBODIMENTS

Figure 1:
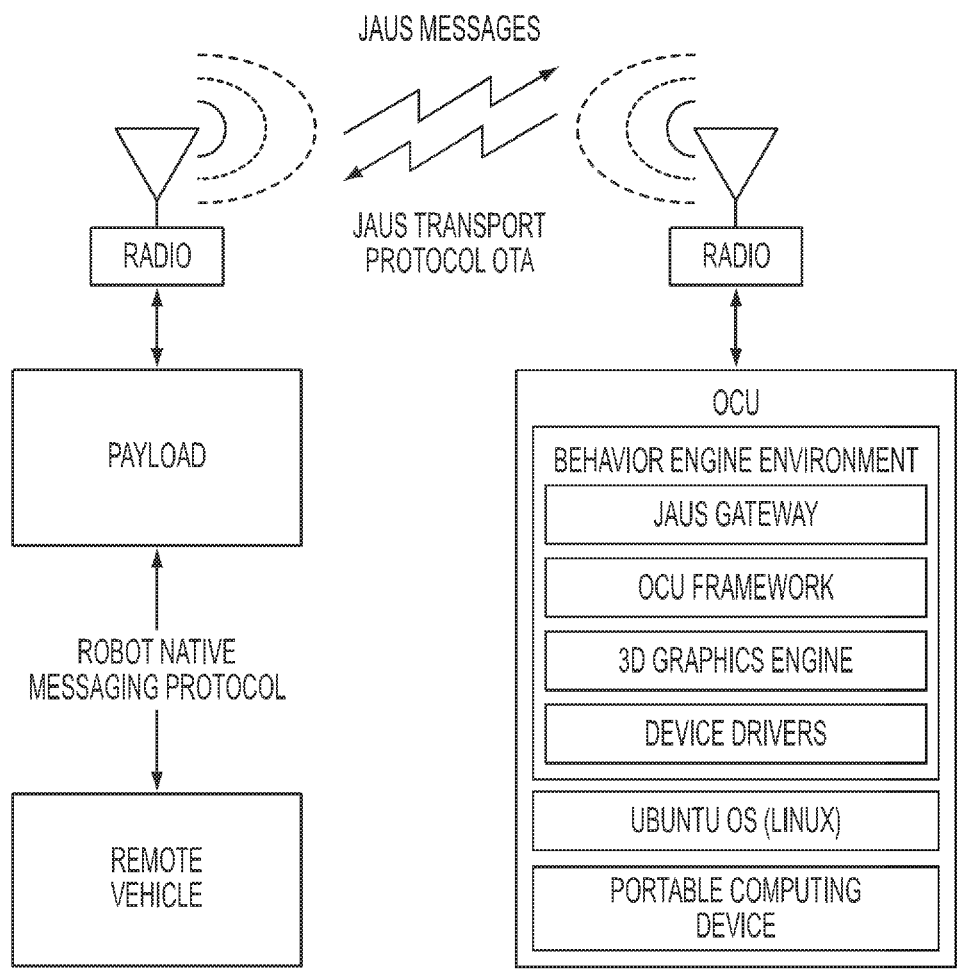
FIG. 1 is a schematic diagram of an exemplary embodiment of a high level system architecture for a system in accordance with the present teachings

Reference will now be made in detail to exemplary embodiments of the present teachings, examples of which are illustrated in the accompanying drawings. Wherever possible, the same reference numbers will be used throughout the drawings to refer to the same or like parts.

The present teachings provide a payload capable of facilitating supervisory control of a remote vehicle used, for example, for surveillance, mapping, and explosive ordnance disposal (EOD) missions. The present teachings also provide an appropriately-designed map-based "point-and-click" operator control unit (OCU) application facilitating enhanced, shared situational awareness and seamless access to a supervisory control interface. The remote vehicle can comprise, for example, an iRobot® Packbot® or other remote vehicle platform. In certain embodiments of the present teachings, a pan/tilt mechanism can be employed for mounting the payload to the remote vehicle chassis, to allow the payload to pan and tilt independent of the vehicle chassis.

A system and method in accordance with the present teachings can provide improved situational awareness for remote vehicle operators by displaying a shared 3D local perceptual space (LPS) on an OCU and simplifying remote vehicle operation by employing a supervisory control metaphor for many common remote vehicle tasks. Integration of shared situational awareness can be facilitated by utilizing a 3D LPS display and point-and-click commands within the 3D LPS display and control for navigation and manipulation including target distance estimations. A point-and-click interface can be used to task the remote vehicle and to provide a shared, graphical view of the tasking and a 3D local environment surrounding the remote vehicle.

Embodiments of the present teachings can combine certain autonomous and semi-autonomous supervisory control behaviors in an integrated package with on-board sensing, localization capabilities, JAUS-compliant messaging, and a tailored OCU with the appropriate interface to maximize the shared understanding and utility of the remote vehicle's capabilities. The resulting system and method can reduce operator effort, allowing an operator to devote more attention to personal safety and his or her mission. In addition, autonomous or semi-autonomous remote vehicle behaviors can be employed with the present teachings to improve the reliability of remote vehicle operation and systems by, for example, preventing common operator error and automating trouble response. Further, by providing a suite of autonomous and semi-autonomous behaviors (which can collectively be referred to herein as autonomous behaviors) utilizing standard sensors and a platform-agnostic JAUS-compliant remote vehicle control architecture, the present teachings can provide a path for interoperability with future JAUS-based controllers and legacy EOD systems.

Certain embodiments of the present teachings can provide JAUS reference architecture compliant remote vehicle command, control and feedback with the payload acting as a JAUS gateway. Standard JAUS messages are employed where they cover relevant functionality. Non-JAUS messages are only utilized to provide capabilities beyond those identified in JAUS reference architecture.

A system in accordance with the present teachings can comprise a sensory/computational module, an OCU, and customized software applications. An exemplary behavior engine for a robotic system is described in U.S. patent application Ser. No. 13/105,872, filed May 11, 2011, titled Advanced Behavior Engine, the entire contents of which is incorporated herein by reference. Further an exemplary OCU and user interface for use in a system as described herein is disclosure in U.S. patent application Ser. No. 13/105,833, filed May 11, 2011, titled Navigation Portals for a Remote Vehicle Control User Interface, the entire contents of which is incorporated herein by reference.

The sensory/computational module can include an integrated suite of GPS, IMU, stereo vision, and range sensors that provide a detailed and accurate 3D picture of the environment around the remote vehicle, which can enable the use of sophisticated autonomous behaviors and reduce the need for real-time, "high-bandwidth" and highly taxing operator micromanagement of the remote vehicle. The autonomous behaviors can include special routines for mapping, planning, navigation, manipulation, obstacle detection and obstacle avoidance (ODOR), resolved end-effector motion (e.g., "fly-the-gripper"), retrotraverse, and self-righting in the event that the remote vehicle has rolled over and can physically provide the actuation necessary for self righting. The OCU includes an application to manage control of and feedback from the payload, and to integrate the payload with a suitable remote vehicle platform.

In situations where the remote vehicle is out of sight, map-based localization and a shared 3D LPS can provide the operator with real-time feedback regarding the remote vehicle's position, environment, tasking, and overall status.

Certain embodiments of the present teachings provide: (1) a principled and robust software architecture that supports a collection of advanced, concurrently-operating behaviors, multiple remote vehicle platforms, and a variety of sensor types; (2) deployable sensors that provide sufficient information to support the necessary level of shared situational awareness between the remote vehicle operator and the on-board remote vehicle autonomy features; (3) lightweight, low-power, high-performance computation unit that closes local loops using sensors; and (4) a user interface that provides both enhanced situational awareness and transparent, intuitive tasking of remote vehicle behaviors.

Certain embodiments of a system in accordance with the present teachings can also comprise a digital radio link built into the OCU configuration and the payload to greatly simplify integration and performance.

FIG. 1 is a schematic diagram of an exemplary embodiment of a high-level system architecture for a system in accordance with the present teachings. As shown, a payload in accordance with the present teachings is mounted to a remote vehicle and communicates with the remote vehicle using the remote vehicle's native messaging protocol. The OCU comprises a behavior engine environment (e.g., iRobot®'s Aware 2.0 software) including a JAUS gateway, an OCU framework, a 3D graphics engine, and device drivers. The OCU also comprises an operating system (e.g., an Ubuntu operating system) and a portable computing device that is preferably ruggedized such as, for example, an Amrel Ruggedized Notebook. The OCU and the remote vehicle/payload communicate wirelessly using JAUS messages and a JAUS transport protocol.

Figure 2:
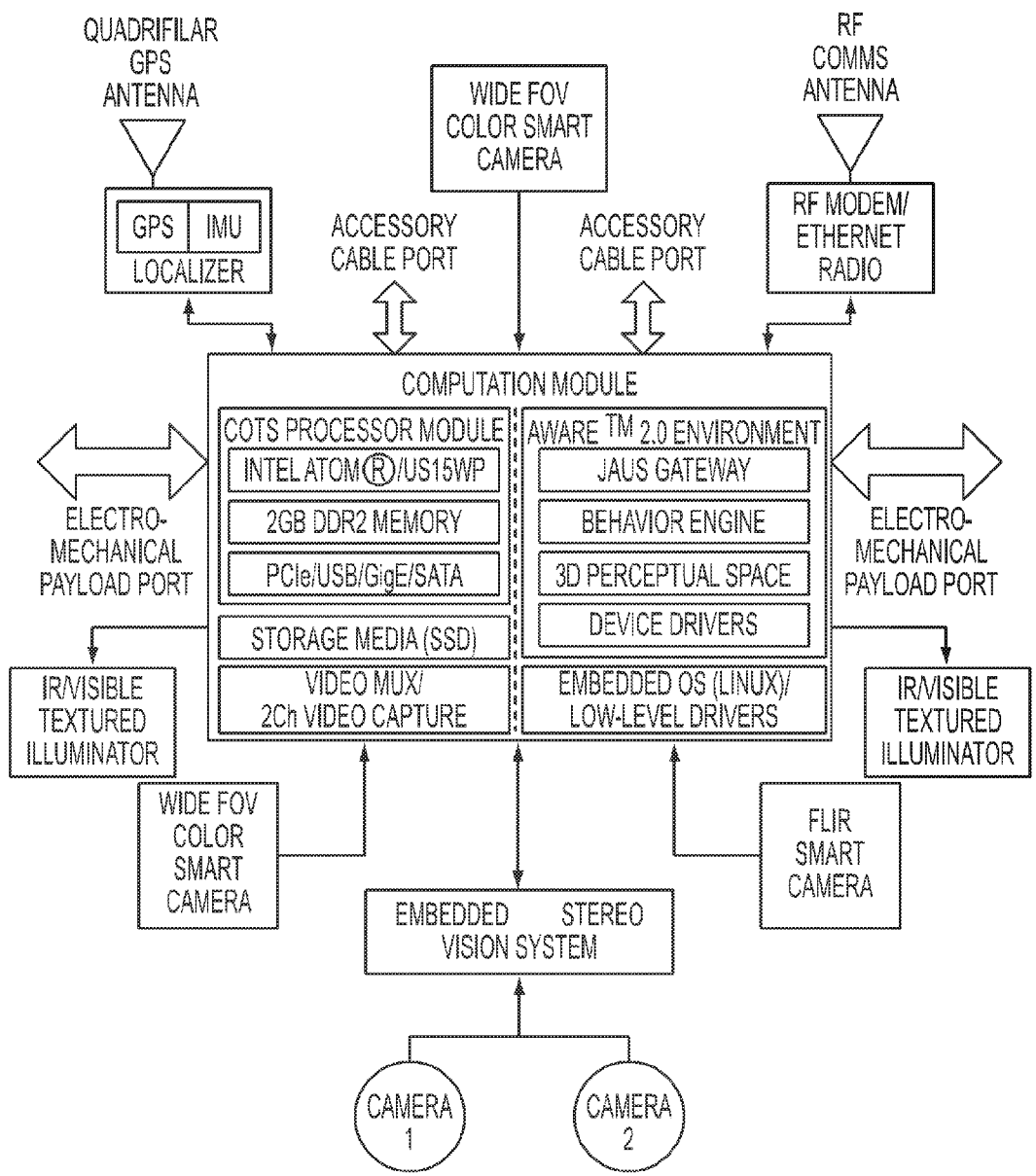
FIG. 2 is a schematic diagram of an exemplary embodiment of a system architecture for a payload in accordance with the present teachings

FIG. 2 is a schematic diagram of an exemplary embodiment of a system architecture for a payload in accordance with the present teachings. The internal architecture of the payload is focused around compact, thermally-capable packaging of high-performance, low-power computation and available sensory modules and components. The payload can integrate, for example, a stereo vision camera such as a Tyzx OEM stereo engine with a computational module (e.g., a COTS ComExpress processor module based on an Intel® Atom® processor) along with several smart camera modules, illuminators, and other supporting electronics. The interface to the payload is preferably flexible, but primarily through power and Ethernet links to the remote vehicle and a networked radio link between the payload and the OCU. The computation module can additionally include storage media, a video MUX multi-channel video capture, the behavior engine environment shown in FIG. 1, and low-level drivers in the embedded operating system.

Effectiveness of the payload can be achieved by tight integration and ruggedized packaging of core sensing, computation, and communications modules, which can include: (1) stereo vision for dense 3D sensing to feed 3D LPS; (2) multiple smart video sources to feed video with minimal power and computational overhead; (3) GPS/IMU for advanced high-performance position estimation; (4) embedded high-performance computation to provide 3D LPS and autonomy; (5) an optional radio link that can simplify communications for evaluation and testing; (6) controlled, textured illumination to eliminate failure modes of stereo vision. Stereo vision relies on texture features to extract depth information. When such features are sparse (a common condition in highly structured, smooth indoor environments), sufficient depth data may not be available. However, with the addition of software-controlled, "textured" illuminators, stereo vision can be made robust for use in all environments. The present teachings contemplate utilizing a laser scanning sensor such as LIDAR for range finding in addition to, or as an alternative to, a stereo vision camera.

Figure 3:
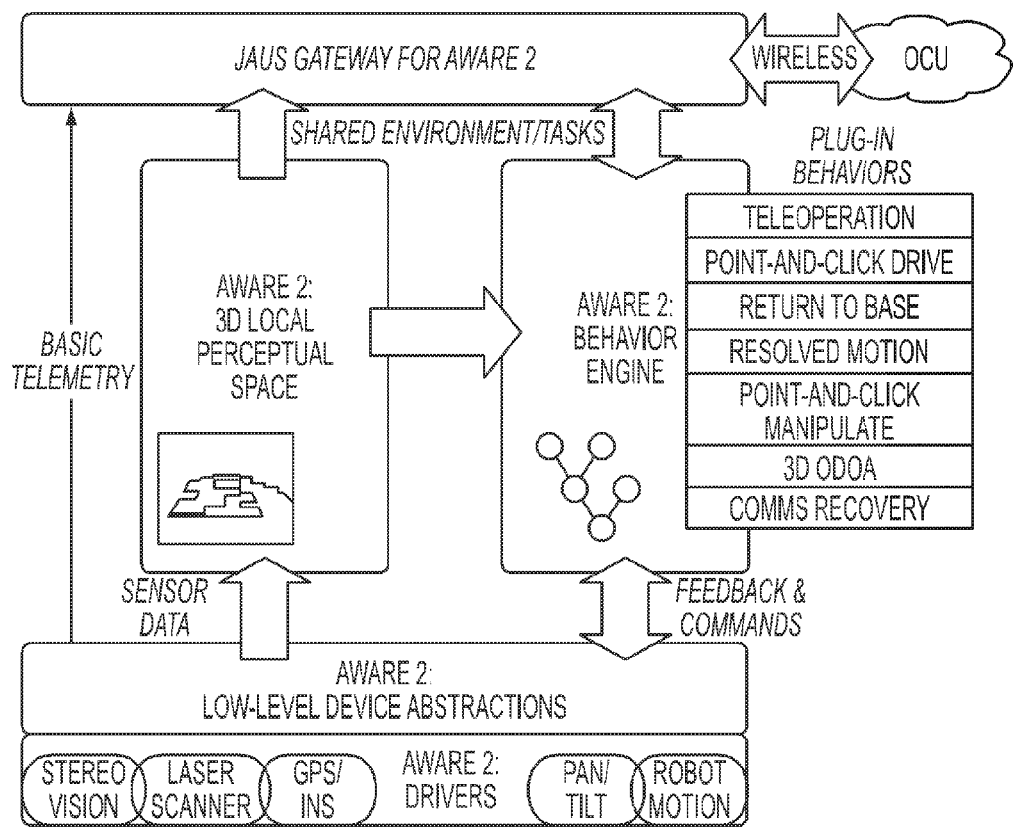
FIG. 3 is a schematic diagram of an exemplary embodiment of integration of existing behavior engine technology and a JAUS gateway.

FIG. 3 schematically illustrates an exemplary embodiment of integration of a system architecture such as iRobot®'s existing Aware™ 2.0 environment and behavior engine with a JAUS gateway. The illustrated 3D local perceptual space (LPS) can comprise a high-performance database that fuses data from localization sensors (e.g., GPS, IMU, odometry) and ranging sensors (e.g., stereo vision, laser scanners, etc.) using fast geometric indexing and Bayesian evidence accumulation and scan registration functionality. The result is a fast, locally accurate 3D "model" of the environment that can be shared between behaviors and the operator. The illustrated exemplary behaviors include point-and-click drive, return to base, resolved motion, point-and-click manipulation, 3D obstacle detection and avoidance (ODOA) and communications recovery.

The behavior engine provides kinodynamic, real-time motion planning that accounts for the dynamics and kinematics of the underlying host remote vehicle.

Both the 3D local perceptual space (LPS) and the behavior engine can be interfaced to the JAUS Gateway. The gateway software module exposes the semi-autonomous capabilities of the behavior engine using JAUS-based messaging to the OCU. JAUS-based messaging is preferably utilized for data that is defined by, for example, an existing JAUS Reference Architecture. For some advanced capability, experimental messages may be utilized.

The 3D local perceptual space receives sensor data from the low-level device abstractions and drivers of the behavior engine environment, including data from the stereo vision camera, laser scanner, and GPS/INS. The low-level device abstractions and drivers of the behavior engine can also provide commands to and receive feedback from, for example, pan/tilt position and robot motion.

Figure 4:
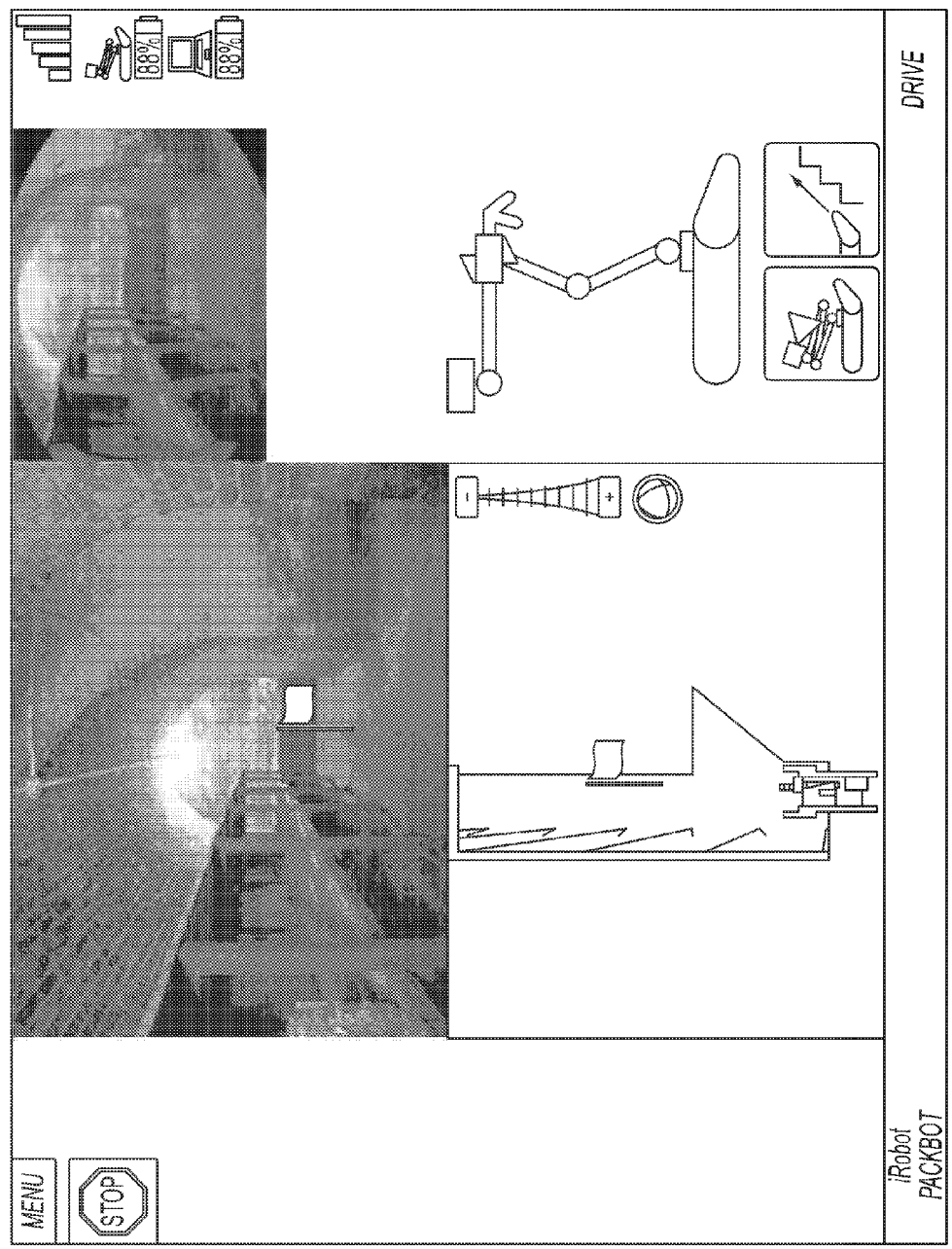
FIG. 4 illustrates a point-and-click interface in accordance with the present teachings.

The present teachings provide semi-autonomous remote vehicle control by replacing teleoperation and manual "servoing" of remote vehicle motion with a seamless point-and-click user interface such as the user interface disclosed in U.S. provisional patent application Ser. No. 13/105,833, filed May 11, 2011, titled Navigation Portals for a Remote Vehicle Control User Interface. An alternative exemplary embodiment of a point-and-click visual interface is illustrated in FIG. 4. The interface is designed so that an operator can issue high-level commands to the remote vehicle using just a few clicks for each high-level command, utilizing a very simple interface that is capable of interpreting the operator's intentions.

In accordance with various embodiments of the present teachings, to intuitively control the remote vehicle, the user interface and robot control system can facilitate the following: a first click can select the part of the remote vehicle that the operator wants to command. For example, clicking on the remote vehicle's chassis selects the chassis and indicates that the operator wants to drive around, while clicking the remote vehicle's head camera indicates that the operator wants to look around. Clicking on the remote vehicle's gripper indicates that the operator wants to manipulate an object, and selection of an object in 3D space determines a target of the remote vehicle's manipulator arm. Clicking on a part of the 3D environment can direct the remote vehicle or the manipulator to that location, and can additionally or alternatively show the distance between the end-effector and that part of the 3D environment.

In an exemplary embodiment, to drive to a location, the operator clicks on the remote vehicle's chassis (to tell the system that he wants to drive the remote vehicle) and then clicks on the video or on the map. A flag (see FIG. 4) or other icon can be overlaid on the map—and optionally in other views such as the video and LPS—to indicate the position toward which the remote vehicle is driving, and the remote vehicle moves toward the selected position. To zoom in, an operator can click on the remote vehicle's camera (e.g., a drive camera or a camera on the payload) and then touch a location on a map, video, or LPS image, or drags a box around a part of the map, video, or LPS image that the operator desires to view more closely. In certain embodiments, the operator can look at a LPS map view from many perspectives by dragging on a widget that will rotate the map view. For example, the operator may wish to see the LPS map from the remote vehicle's viewpoint (i.e., a forward view) or from a top down viewpoint (i.e., a top view).

The OCU display of FIG. 4 includes two video feeds at a top of the screen, the video feeds being from, for example, a drive camera and a camera located on a manipulator arm. The display also includes, in an upper right-hand corner, status information including a communication link status, a robot power status, and an OCU power status. A lower right quadrant of the exemplary display includes a representation of the remote vehicle that can, in certain embodiments, inform the operator of the remote vehicle's pose, configuration, and even orientation. Below the remote vehicle representation are icons that can be used to initiate behaviors such as, for example, a stair climbing behavior. The lower left quadrant of the display can include, for example a map or other representation of the remote vehicle's environment. The above-referenced flags, indicating a desired destination for the remote vehicle, are shown in the LPS map and the left video feed of the exemplary display of FIG. 4.

In certain embodiments, depending on the part of the remote vehicle selected, the system can display a list of available remote vehicle behaviors that are appropriate for the selected remote vehicle part. For example, if the operator clicks on the remote vehicle's chassis, the system can displays a stair climbing button as shown in the lower right-hand corner of FIG. 4. The operator can select stairs for the remote vehicle to climb by clicking on the stairs in the video or on the displayed map, and then the operator can press the stair climbing button to move the remote vehicle to the selected stairs and begin the stair climbing behavior.

Figure 5:
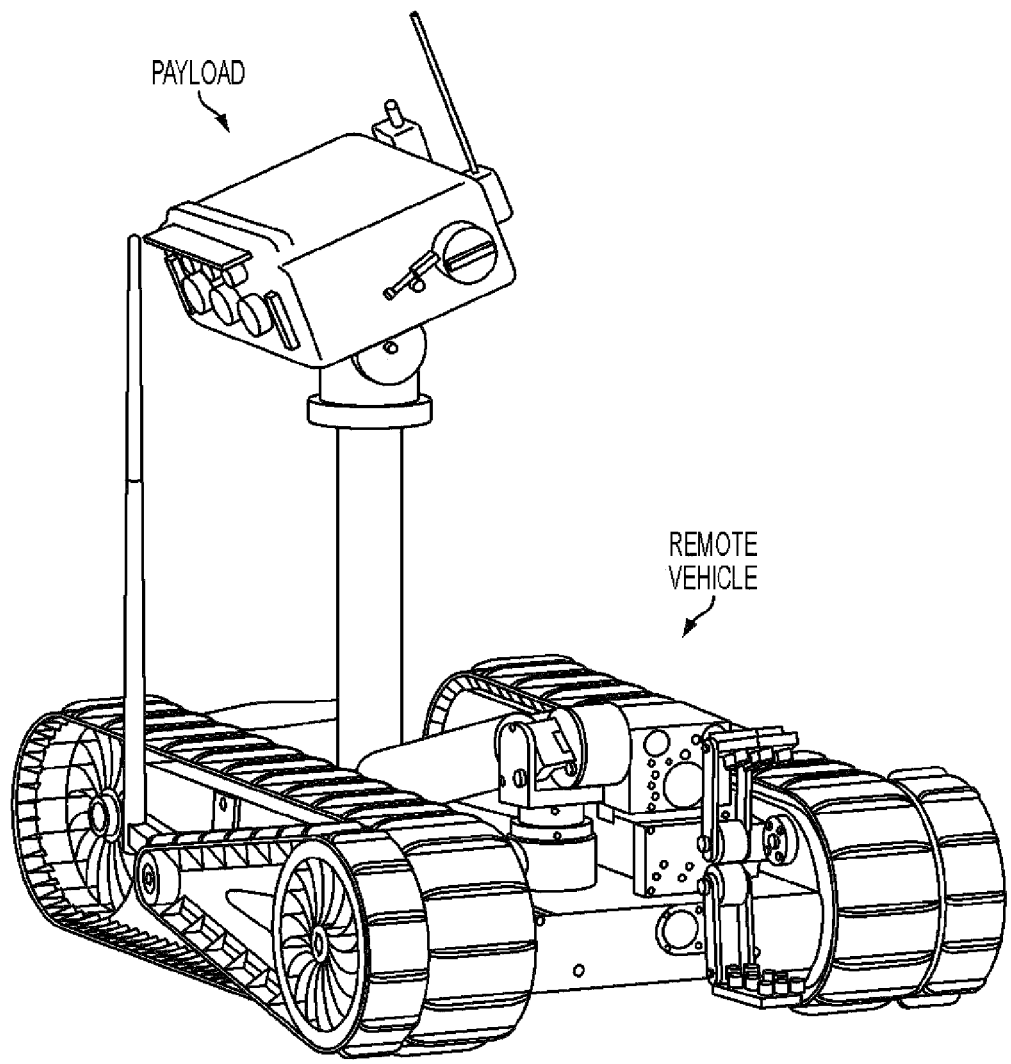
FIG. 5 is a plan view of an exemplary embodiment of a remote vehicle including a payload in accordance with the present teachings.
Figure 6:
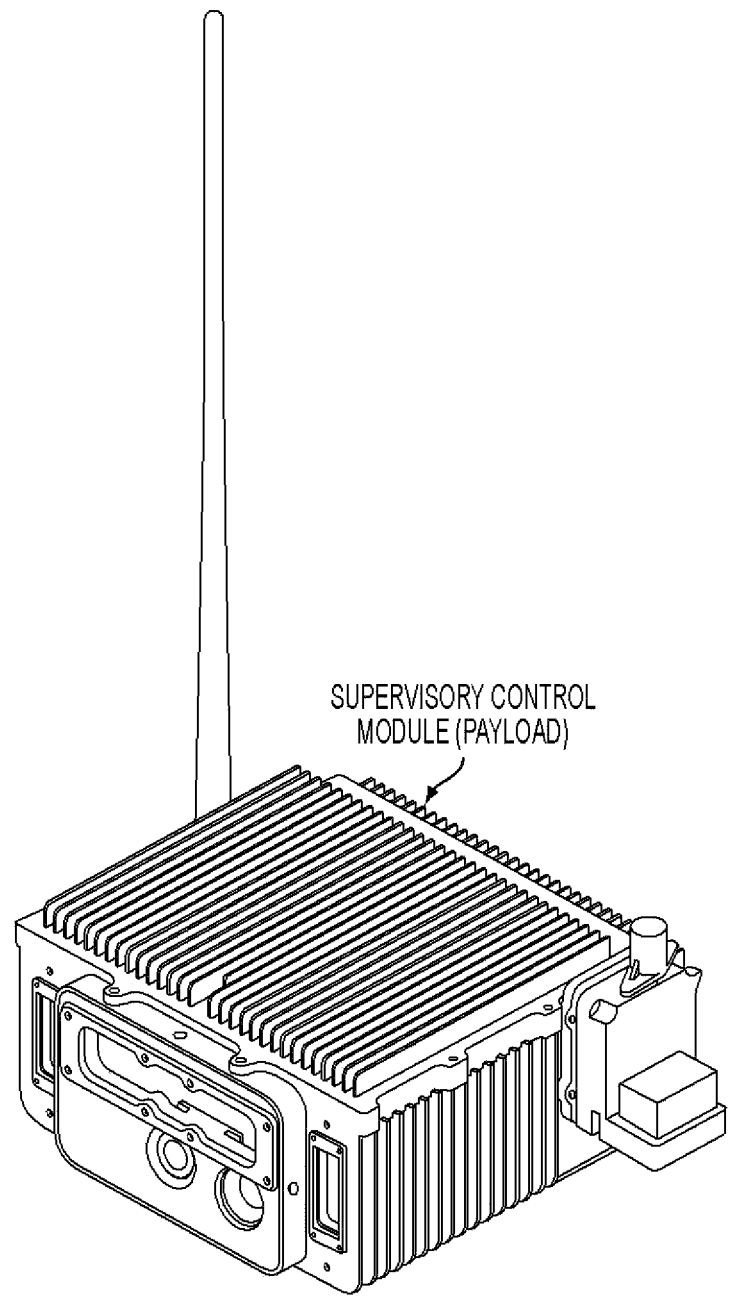
FIG. 6 is a plan view of an exemplary embodiment of a payload in accordance with the present teachings.
Figure 7:
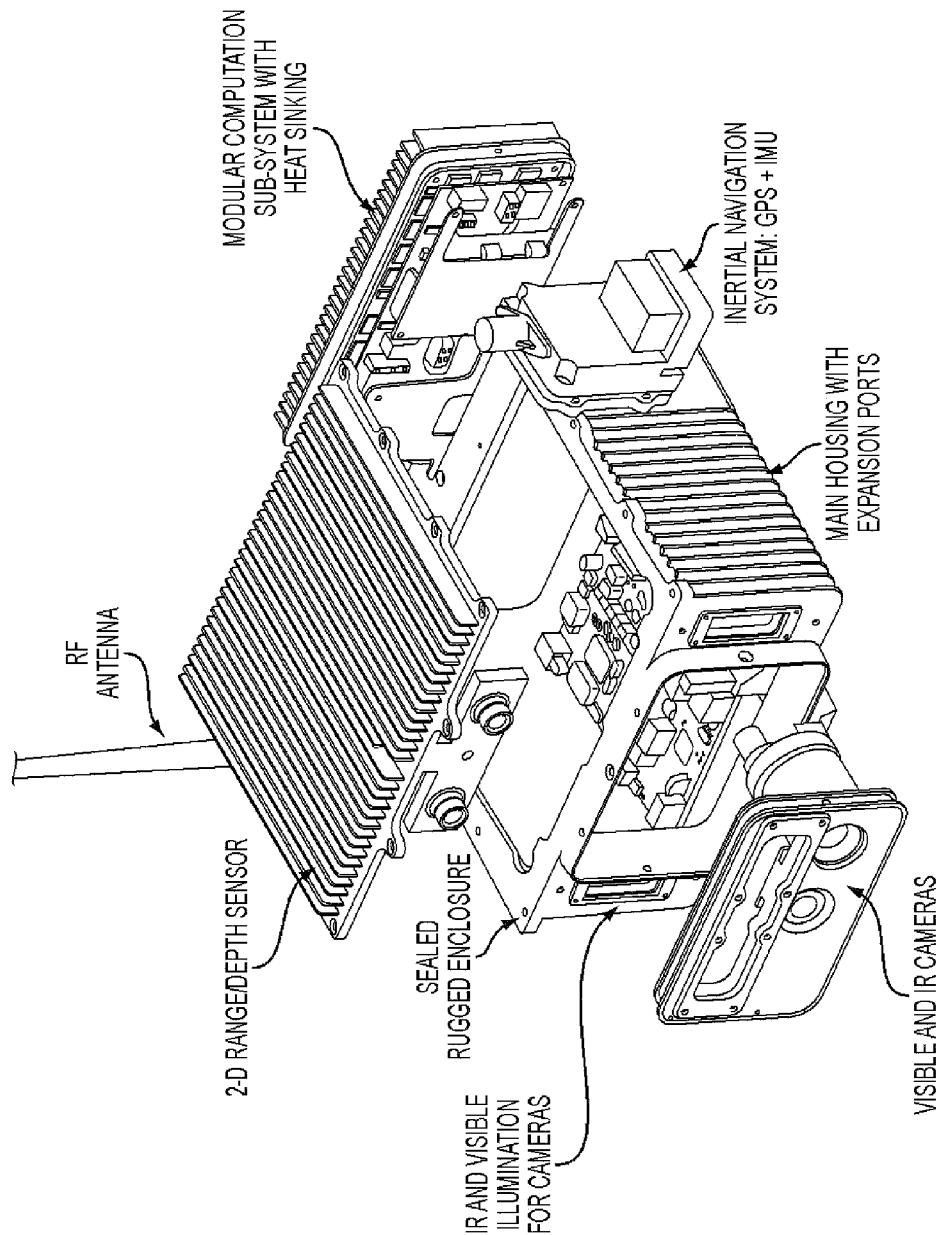
FIG. 7 is an exploded view of the payload of FIG. 6.
Figure 8:
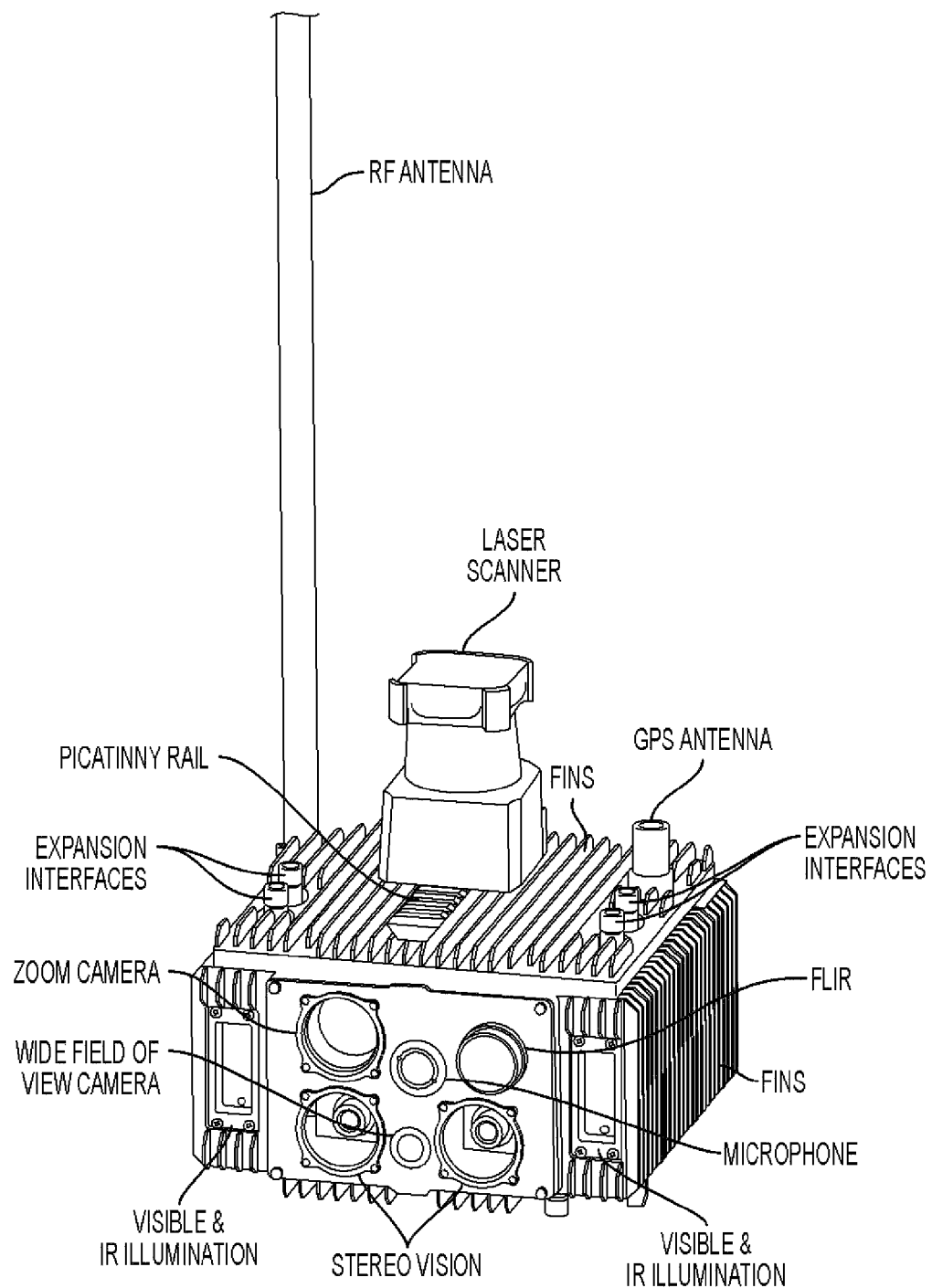
FIGS. 8-11 illustrated another embodiment of a payload in accordance with the present teachings.

FIG. 5 is a plan view of an exemplary embodiment of a remote vehicle including one embodiment of a payload in accordance with the present teachings. The payload can be attached to the remote vehicle using a mast and a pan/tilt mechanism. FIG. 6 is a plan view of an exemplary embodiment of a payload in accordance with the present teachings, and FIG. 7 is an exploded view of the payload embodiment of FIG. 6. As can be seen, the illustrated exemplary payload comprises visible and IR cameras that provide spectral data, material differentiation, and operation in low-light environments. 2D range/depth sensing provided, for example by a stereo vision system and a laser range finder (e.g., LIDAR). IR and visible illumination can be provided for the visible and IR cameras. Visible illumination can comprise "textured" illumination to assist when stereo vision is employed. An integrated RF link can be used to facilitate control of the remote vehicle by allowing communication between the payload and the OCU.

The illustrated exemplary payload also comprises an inertial navigation system that includes GPS and an IMU with localization algorithms. A modular computational subsystem can also be provided in the payload, and can include an integrated passive thermal heat sink. The main housing of the payload can include expansion ports, for example for Ethernet, USB, and RS232, along with additional passive heat sinking. In certain embodiments, the payload can comprise a sealed, rugged enclosure.

FIGS. 8-11 illustrated another embodiment of a payload in accordance with the present teachings. The illustrated payload can be mounted on the remote vehicle via, for example, a mast and pan/tilt mechanism as described above. The payload can optionally comprise a laser scanner mounted on a top thereof. Top mounting of the laser scanner can provide an improved field of view for the laser and therefore improved range data therefrom. The laser scanner can comprise, for example, LIDAR.

The payload embodiment of FIGS. 8-11 also comprises some elements that can be the same as or similar to the previous payload embodiment. For example, the payload embodiment of FIGS. 8-11 comprises an RF communication antenna, a GPS antenna, visible and IR illuminators on front sides thereof, a stereo vision camera (although in this embodiment the stereo vision camera is mounted lower in the payload than in the embodiment of FIG. 7), a long-wave infrared camera. A payload in accordance with the present teachings can additionally include two additional cameras, including a camera having a wider field of view (e.g., 120° field of view) and a zoom camera. In addition, the payload illustrated in FIGS. 8-11 includes a picatinny rail (a bracket sometimes utilized on firearms) on which the laser scanner an be mounted, USB and Ethernet expansion interfaces extending from a top side of the payload housing, a GPS receiver located in the housing (along with the IMU), and an audio input microphone. Passive heat sink fins are located on at least a portion of the top, bottom, sides, front, and back of the payload housing to ensure that heat is adequately removed from the system. The heat sink fins can be required when the payload must be sealed from water and or dust, because such sealing prohibits use of a fan. In addition, a fan can add unwanted weight to the payload.

Figure 9:
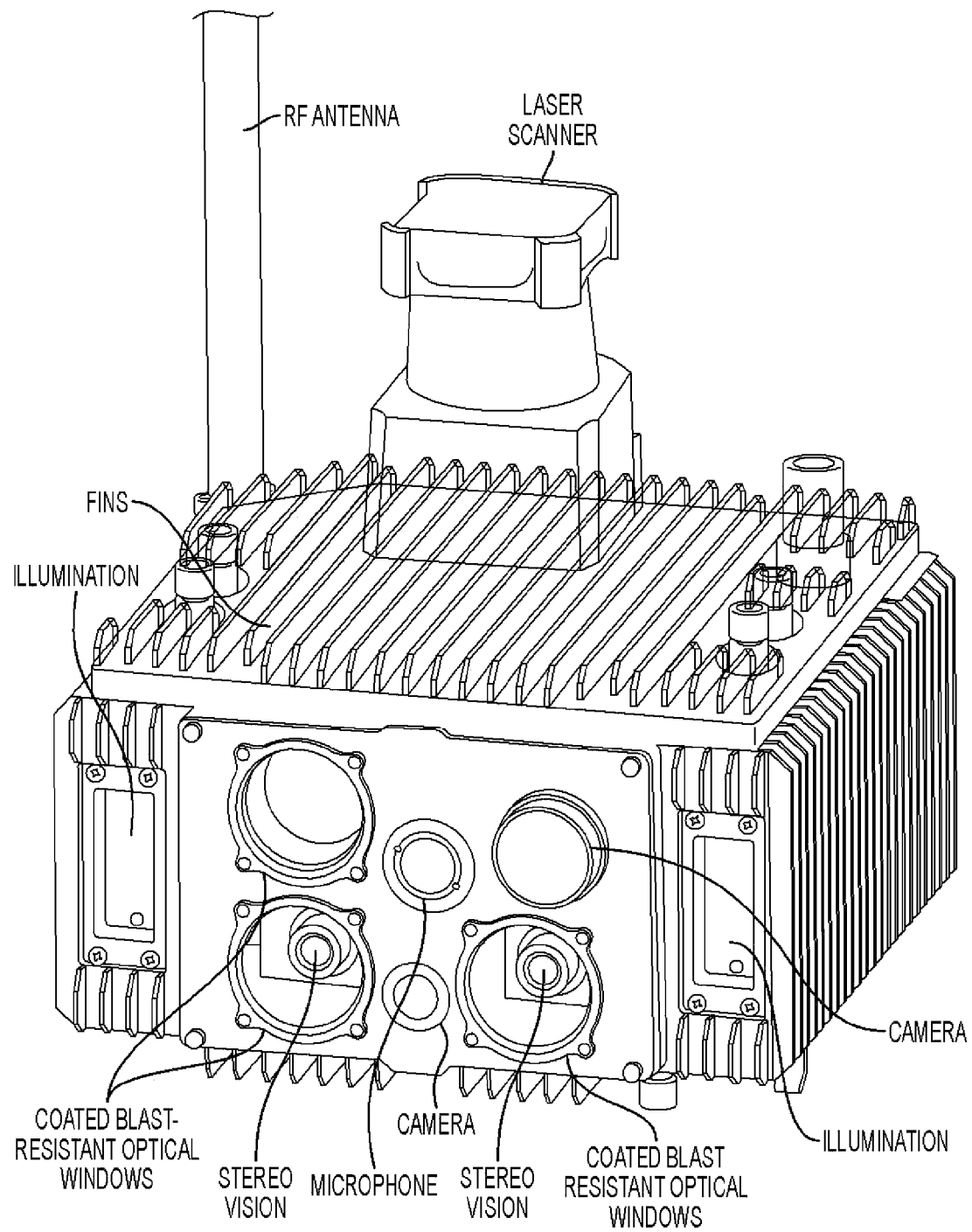
Figure 10:
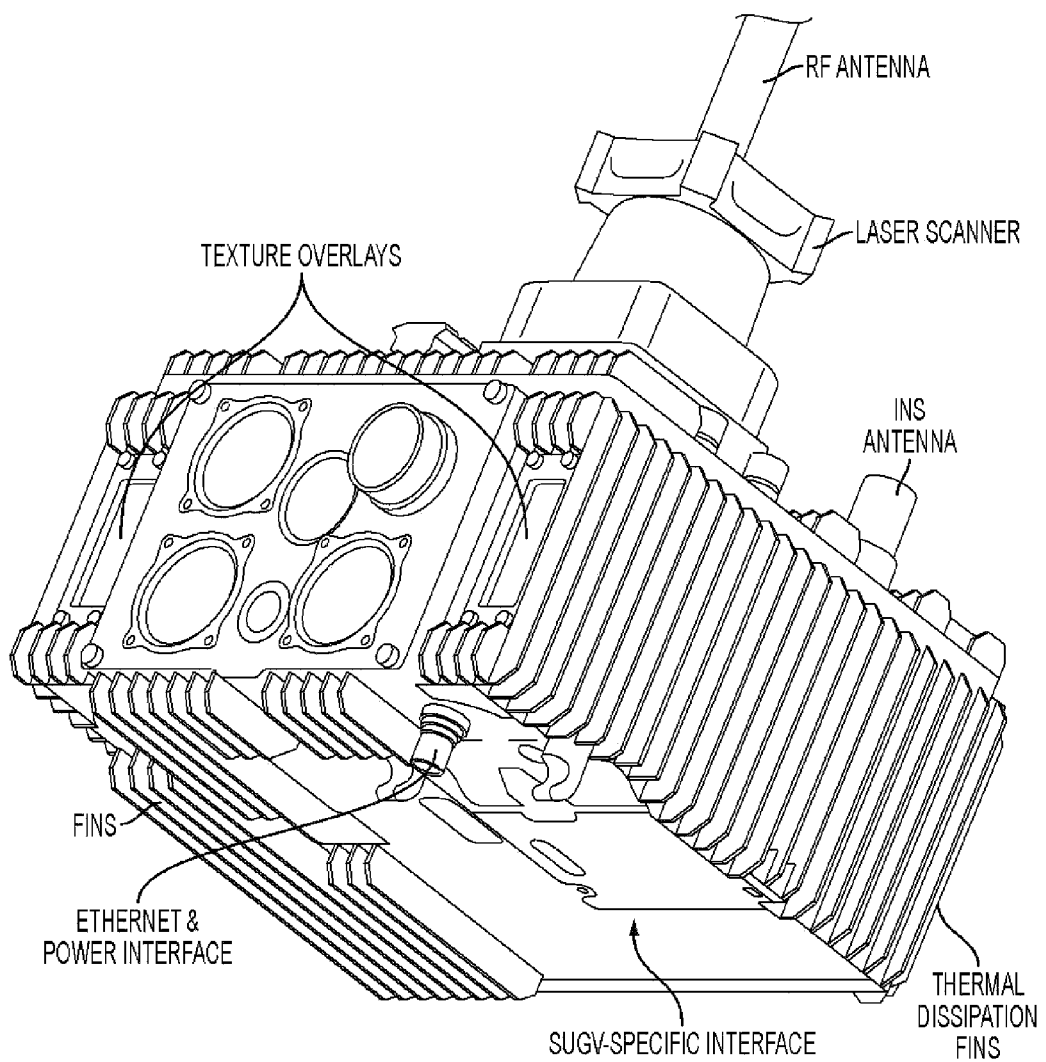
Figure 11:
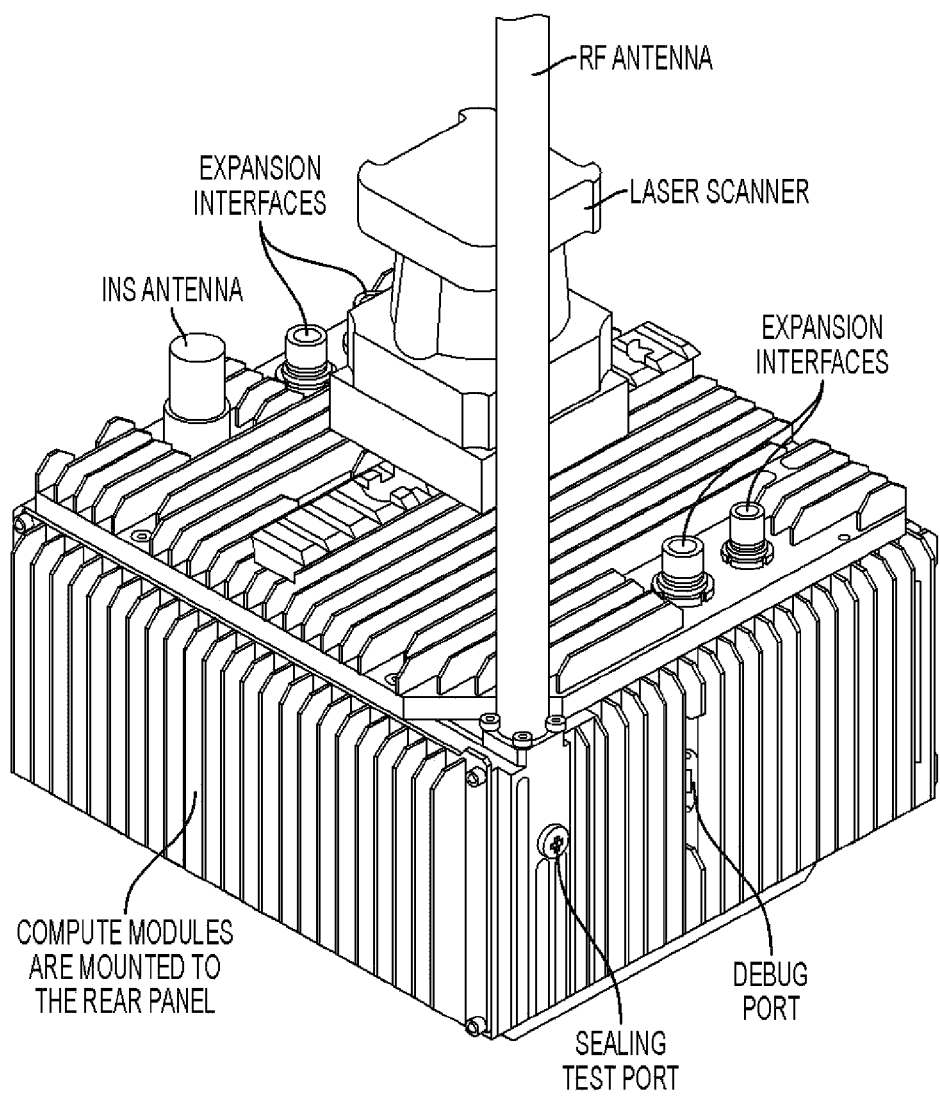

As shown in FIG. 9, a plate having blast resistant optical windows can be placed in front of at least some of the cameras for increased durability. FIG. 10 illustrates texture overlays that can be placed over at least the visible illuminators, along with a bottom portion of the payload that comprises heat sink fins, a generic Ethernet and power interface for additional integration platforms, and a remote vehicle-specific plug or interface. FIG. 11 shows a rear panel to which the compute modules are mounted, a sealing test (e.g., vacuum test) port, and a debug port.

In certain exemplary embodiments of the present teachings, the payload can a volume of less than about 144 cubic inches and can weigh less than about 6 pounds. It can also have a maximum linear dimension of about 8 inches.

In terms of a thermal solution to keep the payload cool enough through passive heat convection, a surface are of the payload should be maximized given the above and other constraints. Maximization of the surface can be achieved as shown, using heat dissipating fins on the external enclosure. In accordance with certain exemplary embodiments, the passive heat reduction of a payload can shed about 500 mW per square inch of nominal surface area (before adding heat fins).

Embodiments of the present teachings also contemplate a payload that can minimize a moment load on the manipulator arm. Pin-type heat dissipation fins could be employed instead of, or in addition to, the illustrated blade-type heat dissipation fins. A tighter integration of the laser scanner into the payload is also contemplated, as well as the use of multi-planar laser scanners, and alternative or additional optical/vision-based ranging sensors (e.g., ASC Ladar, PrimeSense, improves GPS and INS systems, additional object recognition and other useful vision-based algorithms and supporting camera for the same). Using multiple laser scanners and/or stereo vision systems to cover 360° around the payload is also contemplated.

In accordance with various embodiments of the present teachings, transient power distribution of about 45 W steady state and about 60 W transient power dissipation for external operating temperatures from about −21° C. to about +40° C. (with a stretch goal of, for example about −25° C. to about +49° C.). In accordance with certain teachings, the payload comprises about 2.5 lbs of heat dissipating aluminum. The orientation of heat dissipation surfaces can be such that cooling is optimized for the stationary operation since stationary manipulation can be a requirement of the system at least during some of a mission. However, where possible, a "dual purpose" design can be employed that is maximally efficient when stationary and even more efficient when the remote vehicle is in motion. Keeping computation together with sensing can help make the system more modular, with sensor and computation upgrades consisting of, for example, complete payload replacement as new computation and sensor technologies provide a more desirable Size Weight and Power (SWaP) performance. In accordance with various embodiments, the chassis can become more of a "dumb" chassis and the payload can provides the higher degrees of capability (e.g., both autonomous and non-autonomous).

Depending on a configuration of the payload, the present teachings comprise achieving 2-4 times the surface area by adding heat dissipating fins before the fins start to become less efficient. In accordance with certain embodiments, the internal heat generating sources can be coupled directly to the payload housing, which then convects heat to the external atmosphere. Because all surfaces of the payload can provide heat sinking, all surfaces can be given heat dissipating fins except for surfaces that require camera lenses, connectors, or other interfaces. If nothing is mounted to the picatinny rail of the embodiment of FIGS. 8-11, the system can dissipate heats even more efficiently (blocking air flow with the picatinny rail will cause the lid to perform at reduced efficiency due to disruption of air flow. How many pieces to the housing, and why that many and arranged.

In accordance with various embodiments, the system can comprise 4 pieces including a compute panel (rear panel), a power and Ethernet switching and distribution panel (top panel), a Stereo Vision and internal signal routing portion (main housing), and front camera windows (front panel). Breaking the payload into four pieces can improve serviceability and modularity of the payload. The present teachings contemplate constructing a more integrated housing, but at a higher potential cost due to more complex manufacturing.

In accordance with various embodiments of a payload, much of the physical structure of the payload can be defined by an optimal configuration of heat-producing components and a best thermal path to the external environment. While the present teachings could employ more expensive/complex technologies (e.g., heat pipes and other thermal conduction elements) to change an overall configuration of the payload, such technologies could undesirably add weight and cost to the payload.

Given other components of the payload and the bounds imposed by the remote vehicle's physical structure and a size of the payload's sensors and other components, the back panel can provide a good position for processor(s) of the payload, for example two Atom CPU modules. Additionally, a vertically-oriented heat fin is the most efficient orientation for heat fins matched to the high relatively high thermal generation of the processor(s) (e.g., 6 Watts for each CPU).

In accordance with various embodiments, the following components of the payload can be coupled to the housing: CPUs, Ethernet Switches, FPGAs, DSPs, LED illuminators, and some MOSFET components. Some of the components can be attached to the housing using, for example, thermal gap pads. Many low power compute modules can be distributed in a way that does not require any additional or special thermal coupling elements.

In accordance with various embodiments of the present teachings, illumination can be packaged to provide plenty of light, using existing LED illumination packages. The present teachings contemplate alternatively or additional providing 3-D visualization with a single camera and multiple light sources. Textured illumination as described herein can require some additional enhancement including a focusing element allowing an overlay to project a distinct pattern onto textureless surfaces and increase the capability of the stereo vision system.

In certain embodiments, the exterior surface of the housing can provide a variety of external connectors for sensor expansion including, for example, USB 2.0 (2×) and Gigabit Ethernet (2×). In one exemplary embodiment, Glenair Mighty Mouse Series 80 connectors can be utilized as they are becoming an industry standard in UGV/UAV circles. The Glenair sensors are sealed for submersion in water and provide general expansion as new sensors come along. The placement of the connectors can be on a top surface of the payload, for easy access and because that is the only surface presently having room for expansion that doesn't interfere with the remote vehicle housing.

In various embodiment, the orientation and position of all mobile elements of the complete remote vehicle system (manipulators, arms, chassis, etc) must be known in order to back-calculate a position of those mobile elements with respect to the payload. In an exemplary system, absolute encoders can serve this function. An IMU can alternatively or additional be used, but might be more time consuming than the real time updates from encoders. As long as one IMU provides real-world orientation and enough information is known about the orientation of mobile elements in the system, the payload knows its place the world.

In accordance with certain embodiments, the payload can have IP67 or better (1 m depth testing without significant leaks). Sealed boxes can suffer from a lack of air exchange to aid thermal exchange. That is the reason for designing in as many direct thermal paths between hot items and the outside world. Using a waterproof external fan could help with the thermal concerns, but can introduce a robustness risk. There are some "fans" that use membranes that effectively don't have moving parts, are sealed and could be employed, but that would add cost and complexity.

A modular computation system, as used herein, can comprise CPU modules that meet a sub-set of an international standard (COM Express Type 2 interface). In certain embodiments, the compute modules and the rest of the system can be split so that CPUs reside on a separable rear panel that can be individually assembled, tested and used in other designs).

The present teachings contemplate employing GPS, GLONASS, or GALILEO satellite or aerial-based portion sensing equipment interchangeably.

Other embodiments of the present teachings will be apparent to those skilled in the art from consideration of the specification and practice of the teachings disclosed herein. It is intended that the specification and examples be considered as exemplary only, with a true scope and spirit of the present teachings being indicated by the following claims.

What is claimed is:

1. A method for controlling a remote vehicle by interacting with a display, the method comprising:
    displaying on the display a point-and-click interface configured to allow an operator to view an environment surrounding the remote vehicle and control the remote vehicle by inputting one or more commands via the point-and-click interface;
    displaying on the display a 3D local perceptual space comprising an egocentric coordinate system encompassing a predetermined distance centered on the remote vehicle;
    displaying on the display a remote vehicle representation having selectable portions actuatable through the point-and-click interface;
    receiving a selection of a selectable portion of the remote vehicle representation corresponding to the portion of the remote vehicle to be commanded;
    displaying on the display an indication of operator intent to command the selected part of the remote vehicle representation; and selecting one or more commands for the remote vehicle, the one or more commands comprising a command for:
selecting a location in the 3D local perceptual space;
displaying a distance between the location corresponding to the selected point in the 3D local perceptual space and the remote vehicle; and
displaying an icon at the point selected in the 3D local perceptual space and at a corresponding location in an alternative view of a map having an identified current location of the remote vehicle.

2. The method of claim 1, wherein the part of the remote vehicle representation comprises a chassis, and selecting a command for the remote vehicle comprises selecting a stair climbing icon.

3. The method of claim 1, wherein the part of the remote vehicle representation comprises a chassis, and selecting a command for the remote vehicle comprises selecting a location in the video feed to which the remote vehicle will drive.

4. The method of claim 1, wherein the part of the remote vehicle representation comprises a chassis, and selecting a command for the remote vehicle comprises selecting a location in the map to which the remote vehicle will drive.

5. The method of claim 1, wherein the map comprises a 3D local perceptual space display.

6. The method of claim 1, wherein the part of the remote vehicle representation comprises a manipulator arm, and selecting a command for the remote vehicle comprises selecting an object in the video feed for the manipulator arm to manipulate.

7. The method of claim 1, wherein the part of the remote vehicle representation comprises a camera mounted on the remote vehicle, and selecting a command for the remote vehicle comprises selecting a location in a video feed of the camera that the camera should zoom to.

8. The method of claim 1, wherein the part of the remote vehicle representation comprises a camera mounted on the remote vehicle, and selecting a command for the remote vehicle comprises selecting a location on the map that the camera should pan to.

9. The method of claim 8, wherein the map comprises a 3D local perceptual space display.

10. The method of claim 1, further comprising looking at the map from more than one perspective by dragging on a displayed widget that changes the map between at least a top view and a forward view.

11. The method of claim 1, wherein the part of the remote vehicle representation comprises a manipulator arm, and selecting a command for the remote vehicle comprises selecting an object in the map for the manipulator arm to manipulate.

12. A system for increasing an operator's situational awareness while the operator controls a remote vehicle, the system comprising:
an operator control unit having a point-and-click interface configured to allow the operator to view an environment surrounding the remote vehicle and control the remote vehicle by inputting one or more commands via the point-and-click interface, the operator control unit displaying:
a 3D local perceptual space comprising an egocentric coordinate system encompassing a predetermined distance centered on the remote vehicle;
a remote vehicle representation having selectable portions, the selectable portions actuatable by the operator control unit;
an indication to command a portion of the remote vehicle corresponding to a selected portion of the remote vehicle representation;
a distance between a location corresponding to a selected point in the 3D local perceptual space and the remote vehicle; and
an icon at the point selected in the 3D local perceptual space and at a corresponding location in an alternative view of a map having an identified current location of the remote vehicle;
a payload attached to the remote vehicle and in communication with at least one of the remote vehicle and the operator control unit, the payload comprising:
an integrated sensor suite including a global positioning system, an inertial measurement unit, and a stereo vision camera or a range sensor, and
a computational module receiving data from the integrated sensor suite and determining the 3D local perceptual space based on the received data, the computational module determining a resolved motion of the remote vehicle corresponding to the one or more inputted commands.

13. The system of claim 1, comprises at least one smart camera module, illuminators, and supporting electronics.

14. The system of claim 1, wherein an interface between the operator control unit and the remote vehicle includes an Ethernet link from the remote vehicle to the payload and a networked radio link from the payload to the operator control unit.

15. The system of claim 1, wherein the 3D local perceptual space data is stored in a high-performance database that fuses localization sensor data and ranging sensor data using fast geometric indexing and Bayesian evidence accumulation and scan registration functionality.

16. The system of claim 1, further comprising a behavior engine configured to provide kinodynamic, real-time motion planning that accounts for the dynamics and kinematics of the remote vehicle.

17. The system of claim 16, further comprising a Joint Architecture for Unmanned Systems (JAUS) gateway configured to interface with the behavior engine.

18. The system of claim 15, further comprising a Joint Architecture for Unmanned Systems (JAUS) gateway configured to interface with the 3D local perceptual space data.

* * * * *

UNITED STATES PATENT AND TRADEMARK OFFICE
CERTIFICATE OF CORRECTION

| | |
|---|---|
| PATENT NO. | : 8,954,194 B2 |
| APPLICATION NO. | : 13/106792 |
| DATED | : February 10, 2015 |
| INVENTOR(S) | : Robert Todd Pack |

Page 1 of 1

It is certified that error appears in the above-identified patent and that said Letters Patent is hereby corrected as shown below:

In the Claims

At column 12, claim number 14, line number 35, should read "The system of claim 12".

At column 12, claim number 15, line number 40, should read "The system of claim 12".

At column 12, claim number 16, line number 45, should read "The system of claim 12".

Signed and Sealed this
Eighth Day of September, 2015

Michelle K. Lee
*Director of the United States Patent and Trademark Office*